United States Patent [19]

Busch

[11] Patent Number: 5,265,137
[45] Date of Patent: Nov. 23, 1993

[54] WEAR RESISTANT NUCLEAR FUEL ASSEMBLY COMPONENTS

[75] Inventor: Raymond A. Busch, Benton City, Wash.

[73] Assignee: Siemens Power Corporation, Richland, Wash.

[21] Appl. No.: 618,137

[22] Filed: Nov. 26, 1990

[51] Int. Cl.$^5$ .............................. G21C 3/00
[52] U.S. Cl. .................... 376/414; 376/416; 376/305; 376/900; 427/255.2; 427/249; 427/431; 148/206; 148/237; 148/242; 148/281
[58] Field of Search .............. 376/414, 416, 305, 900; 427/255.4, 255.2, 249, 399, 431; 148/133, 206, 237, 242, 281

[56] References Cited

U.S. PATENT DOCUMENTS

| | | | |
|---|---|---|---|
| 3,615,885 | 10/1971 | Watson et al. | 148/6.3 |
| 4,671,824 | 6/1987 | Haygarth | 148/6.11 |

FOREIGN PATENT DOCUMENTS

| | | |
|---|---|---|
| 0105835 | 8/1983 | European Pat. Off. . |
| 0116888 | 8/1984 | European Pat. Off. . |
| 54863 | 3/1967 | Fed. Rep. of Germany . |
| 3512355 | 10/1985 | Fed. Rep. of Germany . |
| 3736565 | 5/1989 | Fed. Rep. of Germany . |
| 1534461 | 8/1967 | France . |
| 1597725 | 6/1970 | France . |
| 55-143485 | 11/1980 | Japan . |
| 63-179286 | 1/1987 | Japan . |
| 2-167494 | 12/1988 | Japan . |
| 860563 | 2/1961 | United Kingdom . |
| 1052243 | 12/1966 | United Kingdom . |
| 2054660 | 2/1981 | United Kingdom . |

OTHER PUBLICATIONS

Patent Abstracts of Japan, vol. 13, No. 290 (C-614) Jul. 5, 1989 and JP,A,1 083 653 (Fujikura) Mar. 29, 1989.
Patent Abstracts of Japan, vol. 9, No. 166 (C-290) (1889) Jul. 11, 1985 and Jp,A60 036 654 (Kobe Seikosho) Feb. 25, 1985.

Primary Examiner—Peter A. Nelson
Assistant Examiner—Ngoclan T. Mai
Attorney, Agent, or Firm—Ira Lee Zebrak

[57] ABSTRACT

Methods and apparatus for improving fretting resistance of zirconium alloy components formed into a shape for use in a nuclear reactor are disclosed in which at least a portion of the outer surface of a component is reacted with material selected from the group consisting of carbon, nitrogen, oxygen and combinations of the foregoing at a temperature below about 700° C. to form a wear resistant layer on the surface of the component.

23 Claims, 1 Drawing Sheet

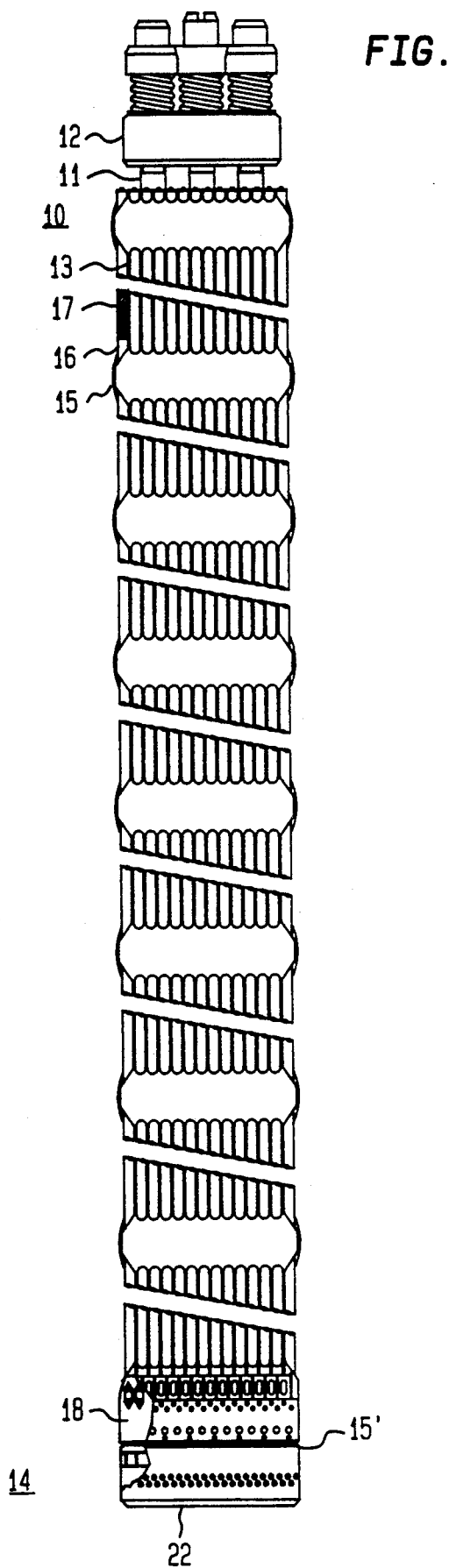
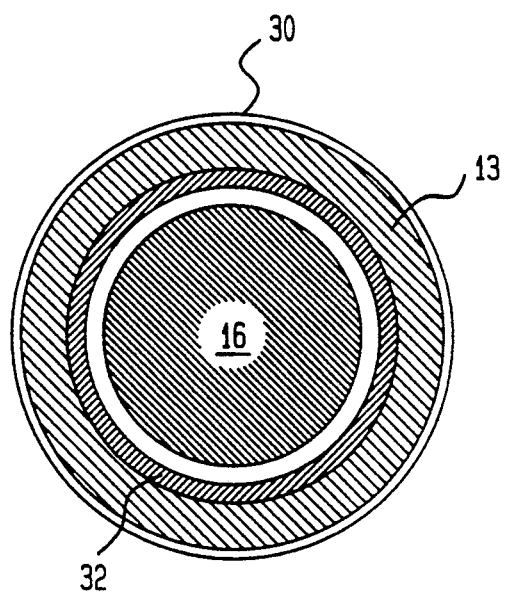
FIG. 1
FIG. 2

WEAR RESISTANT NUCLEAR FUEL ASSEMBLY COMPONENTS

FIELD OF THE INVENTION

This invention relates to wear resistant nuclear fuel assembly components and, more particularly, to surface hardened, zirconium-based alloy components such as nuclear fuel cladding tubes, spacer elements and channels and to methods of making such components.

BACKGROUND OF THE INVENTION

The operating environment within a nuclear reactor, including a pressurized water reactor (PWR) and a boiling water reactor (BWR) is particularly hostile. A considerable effort has been expended in the nuclear reactor industry to arrive at materials which are able to withstand the combination of mechanical, thermal, chemical (corrosion) and radiation effects encountered in that environment. At the present time, only a few types of zirconium-based alloys are considered to be acceptable. Those alloys are generally identified as Zircaloy materials. The Zircaloy materials are used for nuclear fuel cladding tubes, spacer elements and channels within the reactor.

As a result of experience with long term operation and multiple reloads of nuclear fuel elements, it has been found that certain operating conditions arise which tend to reduce the energy output per unit of fuel ("burn-up") obtainable and thereby affect operating costs and efficiencies in an undesirable manner. For example, during the operation of nuclear reactors, metal debris which may be present in the reactor can be carried by the cooling water and can impact upon fuel assembly components. The repeated interaction of such debris and the fuel assembly components (such as fuel cladding tubes, channels or spacer elements) can result in fretting (rubbing) damage to the components.

While the Zircaloy materials gradually have been optimized with respect to corrosion resistance requirements within a reactor, the fretting wear resistance of Zircaloy, as well as resistance to combined effects of fretting wear and subsequent corrosion have not been optimized. The need to improve fretting wear resistance should not result in any undesirable compromise with respect to corrosion resistance.

Zircaloy materials until relatively recently have been treated prior to insertion into a reactor by autoclaving techniques to apply a relatively thin coating (0.5 microns) of oxide material to improve their general operational characteristics. Such an oxide coating has not been found to be resistant to fretting wear or fretting induced corrosion but rather has been found to be subject to being damaged or worn away by the fretting action of the debris. Thereafter, fretting corrosion will occur at the fretting site in the area where the oxide layer has been removed. The corrosion layer which forms is also susceptible to debris fretting wear and will be removed by action of the water and debris. Eventually, after successive cycles of wear and corrosion occur, a hole ultimately can be produced in the base metal itself. In the case of fuel cladding, such a hole will result in the unwanted release of radioactive material and radiation into the cooling water, and if it is in excess of reactor operating limits, will require an untimely shutdown of the reactor for replacement of fuel elements.

One approach to avoiding such problems is to improve the wear resistance of the Zircaloy fuel assembly components, especially at their lowermost ends where debris is most often present.

Outside of the field of nuclear reactors, it has been proposed that layered structures incorporating whiskers of nitrides, carbides or carbonitrides into Group IVb metals, which include zirconium, will provide a hardened surface condition. (See, e.g., U.S. Pat. Nos. 4,915,734; 4,900,525; and 4,892,792.) Furthermore, dispersions of hard substances in a binder metal, such as zirconium oxide dispersed in iron, cobalt or nickel (see U.S. Pat. No. 4,728,579) have been described as providing improved wear resistance for cutting tools. In addition, in the field of cutting tools, it has been observed (see U.S. Pat. No. 3,955,038) that, before applying an oxide coating such as zirconium oxide to a binder metal, imposition of an intermediate layer such as a carbide or a nitride of a metal in the fourth to sixth subgroups of the periodic system (including zirconium) may impede undesirable diffusion of metal from the substrate into the formed oxide layer.

It is understood that the foregoing structures are formed by processes which require temperatures that are incompatible with maintaining the metallurgical state of Zircaloy components to be used in a reactor. That is, such Zircaloy components typically are heat treated to produce particular grain structures and stress relieved conditions in the finished product.

In order to preserve the desired metallurgical structure and properties, it is necessary that any additional wear resistant layer be applied utilizing temperatures that are below temperatures at which the desired properties will be changed.

For example, in the case of stress relieved cladding of a type used in pressurized water reactors, post annealing processing temperatures should be maintained below about 500° C. In the case of cladding, spacers or channels which have been treated to produce a recrystallized condition (as typically used in boiling water reactors), post annealing processing temperatures should be maintained below about 700° C. and, in some cases, below about 600° C. in order to avoid undesired metallurgical changes in the respective components.

STATEMENT OF THE INVENTION

In accordance with one aspect of the present invention, an improved nuclear fuel element of the type including a zirconium alloy tube, which may or may not be separated from a central core of nuclear fuel material by a barrier layer, has a hard, wear resistant layer produced on at least a portion of the outside surface of the tube by reacting the outside surface of the zirconium alloy with material selected from the group consisting of carbon, nitrogen, oxygen and combinations of the foregoing, the reaction occurring below about 700° C. at a temperature which is sufficiently low to avoid unwanted changes (e.g., annealing which changes desired grain structures) near the outer surface of the tube.

In accordance with a further aspect of the present invention, a method of improving fretting resistance of zirconium alloy components for use in a nuclear reactor comprises reacting at least a portion of the surface of the component with material selected from the group consisting of carbon, nitrogen, oxygen and combinations of such materials, the reaction temperature being maintained below about 700° C. at a level to produce a hard, wear resistant layer on the surface without producing undesirable metallurgical changes in the vicinity of the surface.

In accordance with yet another aspect of the present invention, an improved structural component formed of a zirconium alloy for use in a nuclear reactor, the improvement comprising a wear resistant layer produced on at least a portion of a surface of the component which contacts cooling fluid in the reactor, the wear resistant layer being produced by reacting the surface with material selected from the group consisting of oxygen, carbon, nitrogen and combinations of such material, the reaction temperature being maintained below about 700° C. so as to maintain a metallurgical state in the vicinity of the surface which existed prior to the formation of the layer.

BRIEF DESCRIPTION OF THE DRAWING

The foregoing and other features of the present invention will be more readily apparent from the following detailed description and drawings of illustrative embodiments of the invention in which:

FIG. 1 is an elevation view, partially in section, of a typical fuel assembly for a light water nuclear power reactor, the assembly being foreshortened in height and partially broken away for convenience and clarity; and FIG. 2, drawn to a different scale than FIG. 1, is a sectional view of a fuel rod employed in the assembly of FIG. 1 incorporating one version of the present invention.

DETAILED DESCRIPTION

Referring to FIG. 1, a typical 14×14 fuel bundle assembly is indicated generally by the reference numeral 10. Fuel assembly 10 includes an upper tie plate 12 and a lower tie plate 14, capturing at opposite ends a plurality of (e.g., 176) fuel rods 13 of tubular shape. A plurality of guide tubes 11 are secured to upper tie plate 12 and to lower tie plate 14. A plurality of grid spacers 15 (e.g., eight several of which are shown) are disposed along the length of fuel rods 13 at locations between tie plates 12 and 14 and form cells, as is well known, through which fuel rods 13 and guide tubes 11 extend. A lowermost one 15' of the grid spacers is illustrated as a debris-resistant spacer of the type shown and described in U.S. Patent No. 4,849,161 of Brown et al.

Each of fuel rods 13 encloses a stack of fissionable fuel pellets 16. Pellets 16 in each stack are maintained in close proximity to each other by means of a spring 17 disposed between an upper end of the rod 13 and the uppermost one of pellets 16. A lower end cap 18 of each fuel rod is in close proximity to but spaced away from the upper portion of lower tie plate 14 to take into account the expected linear growth of rods 13 in the operation of the reactor. The total height from the bottom of lower tie plate 14 to the top of the uppermost pellet 16 (i.e., the top of the active fuel) may, for example, be a few inches less than twelve feet.

Lower tie plate 14 may be entirely conventional or may comprise a debris resistant design above the lower core support plate 22.

Coolant supplied from below the lower tie plate 14 may be expected to carry debris of the type noted above. As the coolant (water) flows upwardly, some debris will be intercepted and can drop down below the plate 22. Some amount of debris, however, can impact upon the exterior surface of fuel rods 13, spacers 15 and, in the case of BWR assemblies, enclosing channel structure, particularly at the lower ends thereof. In the case where a fuel assembly does not include a debris catching device or screen, an even greater amount of debris may be expected to impact upon the exterior surface of fuel rods 13, spacers 15 and other components in the fuel assembly.

Fuel rod cladding, spacers or channels may be manufactured in accordance with the present invention to include a method for final hardening treatment of the surface(s) of the components which are exposed to coolant water and accompanying debris.

A process in accordance with this invention, which is applicable to treating either one or more surfaces of zirconium alloy material, whether it is in strip, sheet or tubular form, will produce components having an extended service life. It is preferable, in order to retain the desired metallurgical condition of the component, that hardening operations be conducted without exceeding a temperature of, for example, 500°–700° C., the specific limit temperature being dependent upon the function and/or nature of the component and the environment (PWR or BWR) in which the component is to be employed as noted above.

In accordance with the one aspect of the present invention, a method of improving fretting resistance of zirconium alloy components used in nuclear reactors comprises placing the alloy component into a closed vessel, introducing a gaseous atmosphere containing acetylene and raising the temperature within the vessel to a temperature in the range of 450° C. to 500° C., preferably to 475° C .for a period of 8 hours so as to produce a hard, wear resistant carbide layer on the surface of the alloy component. The carbide layer will be of the order of one micron thick (typically slightly less), and will exhibit a hardness acceptable for resisting fretting in a nuclear reactor environment. The carbide layer which is produced in this manner is black in color.

Cladding and flat Zircaloy material treated with acetylene as described above to produce a wear resistant layer thereafter was subjected to a standard autoclaving test to determine whether the wear resistant layer was also resistant to waterside corrosion. The results of testing for corrosion resistance alone were that such corrosion resistance was equal to or better than that obtained for components which were the same in all respects except that they were not provided with the wear resistant layer.

In accordance with a further aspect of the invention, a method of improving fretting resistance of zirconium alloy components used in nuclear reactors comprises placing at least a portion of an alloy component to be treated in a molten bath containing one or more cyanide salts having an effective melting point less than 500° C. for a period of four to twelve hours to produce a wear resistant layer on the alloy component. In one particular arrangement, a mixture of 60% sodium cyanide and 40% potassium cyanide (weight percent) was used to produce a hard, wear resistant layer two microns thick which was black in color. X-ray fluorescence analysis of the layer so formed indicated the presence of oxide material, although it is normally to be expected that a carbonitride layer is formed by means of a cyanide bath. The resulting surface layer was found to be of increased hardness and wear resistance as compared to the Zircaloy itself.

In accordance with a further aspect of the invention, a method of improving fretting resistance of zirconium alloy components used in nuclear reactors comprises placing at least a portion of an alloy component to be treated in a molten bath containing one or more carbonate salts having an effective melting point less than 500° C. for a period of four to twelve hours to produce a wear resistant oxide layer on the alloy component. In one particular arrangement, a mixture of 50% lithium carbonate and 50% potassium carbonate (weight percent) was used to produce a hard, wear resistant layer two microns thick which was black in color. X-ray fluorescence analysis of the layer so formed indicated the presence of oxide material. The resulting surface layer was found to be of increased hardness and wear resistance as compared to the Zircaloy itself.

In accordance with a further aspect of the present invention, a method of improving fretting resistance of zirconium alloy components used in nuclear reactors comprises lacing the zirconium alloy component in a closed furnace, introducing an air or oxygen atmosphere into the furnace, and raising the temperature within the furnace to a temperature level between about 400° C. and 500° C. (preferably less than 475° C.) for a period of between about forty and about eighty hours to grow a hard, wear resistant oxide layer on the surface of the alloy component. The oxide layer so formed typically will be in the range of between about 0.7 microns and 1.4 microns thick (that is, of the order of one micron) and will e black in color.

The grown oxide layer exhibits a desired resistance to corrosion which might occur in a nuclear reactor environment while, at the same tie, providing an increased fretting resistance.

In each of the foregoing examples, the wear resistant layer was produced without compromising the corrosion resistance characteristics of the zirconium alloy component. Particular attention must be paid to the maximum reaction temperature in each case to avoid undesirably changing the metallurgical structure of the components. To that end, temperatures less than about 500° C. were employed in each example for cladding in the stress relieved condition. Appropriate reaction temperatures (e.g., temperatures in the vicinity of about 600° C. to 700° C.) for components other than stress relieved cladding, such as recrystallized cladding, channel and spacers, similarly should be observed to avoid undesired secondary effects on metallurgical characteristics such as grain size or structure.

As is shown in FIG. 2, typical fuel cladding 13 constructed in accordance with the present invention includes an outer wear resistant layer 30 over at least a portion of the length thereof (typically at least the lowermost portion). The thickness of layer 30 is exaggerated in FIG. 2 compared to the dimensions of other elements. The inner surface of cladding 13 may be separated from fuel pellets 16 by a barrier layer 32 (as is known). The invention is also useful in connection with non-barrier cladding, spacers and channels as noted above.

It should be recognized that various modifications may be made in the apparatus and processes described above without departing from the true scope of the present invention, which is pointed out in the following claims.

What is claimed is:

1. A method for increasing fretting resistance of zirconium alloy components having processed metallugical characteristics for use in a nuclear reactor comprising:

providing a zirconium alloy component;

reacting at least a portion of an outer surface of said component at about atmospheric pressure with a material selected from the group consisting of carbon compounds suitable for forming a carbide, cyano or carbonate compounds suitable for forming an oxide, air or oxygen for forming an oxide and combinations of the forgoing, at a temperature below 500° C. to avoid changes in the metallurgical characteristics of the zirconium alloy component, the reaction producing a black wear resistant layer on said surface.

2. A method according to claim 1 wherein:
   said wear resistant layer contains at least one of a carbide and oxide of zirconium.

3. A method according to claim 1 wherein:
   said step of reacting continues for a duration sufficient such that the black wear resistant layer has a thickness on the order of one micron or greater.

4. A method according to claim 2 wherein:
   said step of reacting continues for a duration sufficient such that the black wear resistant layer has a thickness between about one and about two microns.

5. A method according to claim 1 wherein:
   said step of reacting continues for a duration sufficient such that the black wear resistant layer as a thickness of at least 0.7 microns.

6. A method according to claim 1 further comprising:
   placing said component into a closed vessel;
   said reacting step comprising introducing a gaseous atmosphere containing acetylene into said vessel; ad,
   raising the temperature within said vessel to about 450° C. to 500° C. for a time interval sufficient to produce a black wear resistant carbide layer on said component.

7. A method according to claim 6 wherein:
   said time interval is about eight hours;
   said temperature is about 475° C.; and
   said black wear resistant layer is of the order of one micron in thickness.

8. A method according to claim 1 wherein said reacting step comprises:
   placing said component portion in a molten bath containing at least one cyanide salt; and,
   maintaining said component in said bath at a temperature of less than 500° C. for a time interval sufficient to produce a black wear resistant oxide layer on said surface.

9. A method according to claim 8 wherein:
   said molten bath consists of a mixture of sodium cyanide and potassium cyanide; and
   said time interval is sufficient to produce a black wear resistant layer of about two microns thickness.

10. A method according to claim 9 wherein:
    said bath consists of about sixty percent sodium cyanide and about forty percent potassium cyanide; and
    said time interval is in the range of four to twelve hours.

11. A method according to claim 1 wherein:
    said step of reacting continues for a duration of between about four and twelve hours.

12. A method according to claim 11 wherein:
    said duration is about eight hours.

13. A method according to claim 8 wherein:
    said time interval is sufficient to produce a wear resistant layer of about two microns thickness.

14. A method of according to claim 1 wherein said reacting step comprises:
   placing said component portion in a molten bath containing a mixture of lithium carbonate and potassium carbonate; and,
   maintaining said component at a temperature of less than 500° C. for a time interval sufficient to produce a black wear resistance layer on said component.

15. A method according to claim 14 wherein:
   said bath comprises of about 50 percent lithium carbonate and about 50 percent potassium carbonate; and,
   said time interval is in the range of four to twelve hours.

16. A structural component for use in a fluid cooled nuclear reactor having increased fretting resistance, the component comprising a shaped article formed of a zirconium alloy and having processed metallurgical characteristics, a black wear resistant layer produced on at least a portion of a surface of said article which contacts cooling fluid in said reactor, said black wear resistant layer being produced in a reaction of the metals integral with said surface with a material selected from the group consisting of carbon compounds suitable for forming a carbide, cyano or carbonate compounds suitable for forming an oxide, air or oxygen and combinations of the forgoing at a temperature below 500° C. to avoid changes in the metallurgical characteristics of the zirconium alloy, the article having maintained the metallurgical characteristics in the vicinity of said surface which existed prior to formation of said layer.

17. The structural component according to claim 16 wherein said black wear resistant layer contains at least one of a carbide and oxide of zirconium.

18. The structural component according to claim 16 wherein said black wear resistant layer is on the order of at least one micron in thickness.

19. The structural component according to claim 16 wherein said black wear resistant layer has a thickness of about 1 to 2 microns.

20. The structural component according to claim 16 wherein said black wear resistant layer includes at least a carbide of zirconium.

21. The structural component according to claim 16 wherein the shaped article comprises a nuclear fuel element being a hollow fuel rod having an inside surface and an outside surface, said outside surface incorporating the black wear resistant coating, a fissionable fuel material being enclosable within said rod adjacent said inside surface.

22. The structural component according to claim 21 wherein said hollow fuel rod is tubular and has a circular cross-sectional area.

23. The structural component according to claim 16 wherein said black wear resistant layer is on the order of one micron in thickness or greater and includes an oxide of zirconium.

* * * * *